E. SCHWETER.
STEAM ENGINE.
APPLICATION FILED JAN. 23, 1914.
1,093,655.
Patented Apr. 21, 1914.
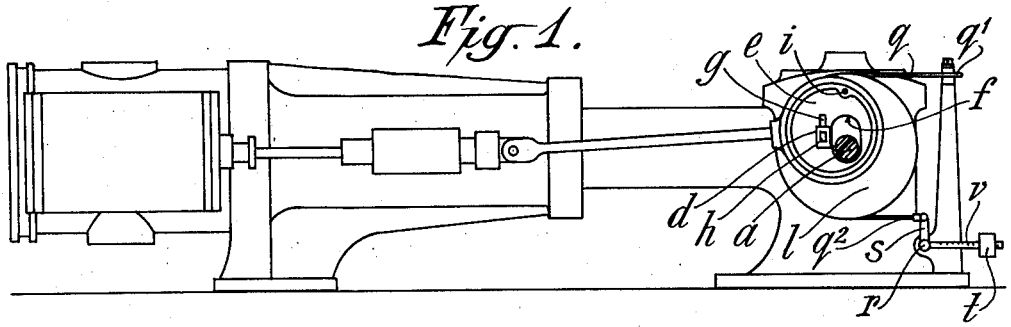
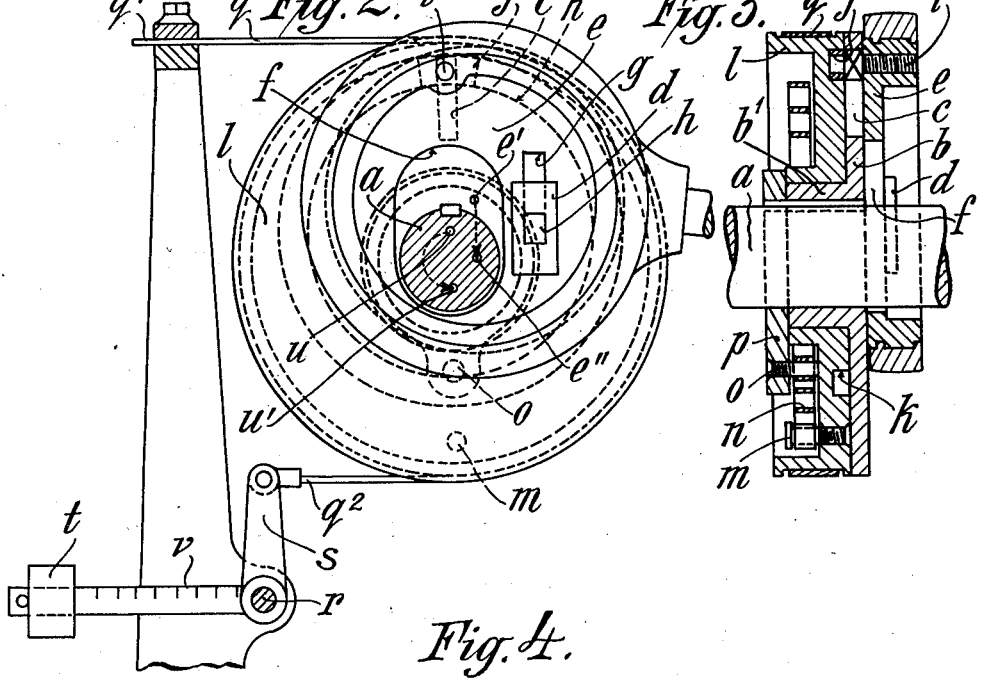
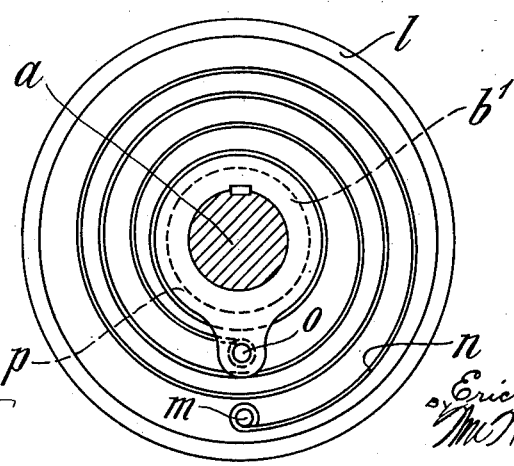
WITNESSES:
John C. Sanders
Albert F. Houman
INVENTOR:
Erich Schweter
M. Wallace White
ATT'Y

UNITED STATES PATENT OFFICE.

ERICH SCHWETER, OF WILKES-BARRE, PENNSYLVANIA.

STEAM-ENGINE.

1,093,655.  Specification of Letters Patent.  Patented Apr. 21, 1914.

Application filed January 23, 1914. Serial No. 813,826.

*To all whom it may concern:*

Be it known that I, ERICH SCHWETER, a subject of the King of Prussia, residing at Wilkes-Barre, in the county of Luzerne and State of Pennsylvania, have invented certain new and useful Improvements in Steam-Engines, of which the following is a specification.

The invention has for its object to regulate the supply of steam to steam engines or the like by means of a cam adjusted by hand or by a regulating device and affecting the valve gear, so that it is possible to give the steam engine any desired supply. For this purpose the cam or eccentric is arranged in a lineally displaceable manner on a disk which is rigidly connected to the crank shaft and, the cam is provided with a pin, adapted to engage an eccentric groove of a brake disk loosely placed on the fixed disk, which brake disk, by changing the brake pressure, can be so influenced that it lags behind the fixed disk to the extent of a certain angle. In this connection it effects, at the same time, a displacement of the eccentric center and thereby causes a change. The change in the brake pressure is effected either by hand or by the governing device.

The device is simple in construction, since it consists of but a few parts, and as it occupies only a small amount of space in an axial direction, it can be arranged conveniently on the crank shaft.

In the drawing in which the invention is shown by way of an example, Figure 1 shows the device in conjunction with an engine, Fig. 2 is a front view of the device, Fig. 3 is a cross section and Fig. 4 a rear view.

Secured to the crank shaft $a$ of the engine is a disk $b$ which is provided with a recess $c$. Against this disk a plate $d$ presses an eccentric $e$, which eccentric is loosely mounted on the shaft $a$, and is provided with a recess $f$ whereby it can be displaced vertically with respect to the crank shaft. In this connection it is guided by a pin $h$ arranged on the disk $b$ and passing through a slot $g$ formed in the eccentric. The eccentric is provided with a bolt $i$ which extends through the recess $c$ and engages a sliding block $j$ which is guided in an annular groove $k$, arranged eccentrically to the crank shaft, and formed in a brake disk $l$ loosely mounted on the hub $b^1$ of the disk $b$. The brake disk is provided with a pin $m$ to which one of the ends of a spiral spring $n$ (Fig. 4) is attached, the other end being connected to a pin $o$ carried by a disk $p$ tightly attached to the crank shaft. This spiral spring represents a coupling between the loose brake disk $l$ and the stationary disk $b$ and causes the brake disk $l$ to rotate when the crank shaft rotates. Bearing on the brake disk $l$ is a brake band $q$ one of whose ends $q^1$ is made secure, while the other end $q^2$ is attached to one of the arms of a bell-crank lever $s$ pivoted at $r$. The other arm of this lever is provided with an adjustable weight $t$ which can be regulated by hand. This lever arm is provided with a scale $v$ to indicate the different positions of the weight corresponding to the various degrees of steam supply.

The operation of the device is as follows: If the engine is set for a certain steam supply, the disk $b$, when the crank shaft turns, actuates the eccentric $e$ and also through the spiral spring $n$, the brake disk $l$. Now, if it is desired to change the supply, the pressure of the brake band $q$ on the brake disk $l$ is changed by adjusting the weight $t$. If the pressure is increased, the brake disk $l$ lags behind the disk $b$ until the tension of the spiral spring $n$ counterbalances the brake pressure. By changing the angle between the brake disk and the disk $b$, the center $u$ of the ring or circular groove $k$ also undergoes a lineal displacement. If the difference in the position of the angles of the two disks is 180°, for instance, the center $u$ of the circular groove takes the position $u'$. The sliding block $j$ transmits this motion to the bolt $i$ which is correspondingly displaced in the guiding slot $c$ of the disk $b$ and, in this connection, moves the eccentric $e$ which is connected with it, so that the center of the eccentric undergoes a linear displacement from $e'$ to $e''$. According to the displacement mentioned, the steam supply of the engine is changed. The position of the eccentric center at $e'$ corresponds with the maximum, and the position at $e''$ with the minimum supply. The intermediate positions of the eccentric center which correspond to various torsion angles between the disk $b$ and the brake disk $l$, provide for intermediate supply. By changing the brake power in various ways, it is possible to obtain torsion angles varying from 0° to 180° and thus, through the changes in the position of the eccentric center, the steam supply may be varied from naught to the maximum amount.

As the various degrees of steam supply are indicated by the scale $v$ of the lever $s$, it is possible to regulate the engine to the desired supply by hand in the most simple manner by properly adjusting the weight $t$. It is also possible, however, to connect the lever $s$ with the sleeve of a governor which, with the aid of the device described, always keeps the engine at a uniform load corresponding with its number of revolutions.

The diameter of the circular groove $k$ is selected in such a way that the brake disk $l$ brakes itself, so that the jars occurring in the eccentric and emanating from the valve gear of the engine are absorbed or intercepted in all positions of the sliding block $j$ by automatically braking, thus being incapable of causing any change in the torsion angle between the disk $b$ and the brake disk $l$.

I claim:

1. In a device of the character described, the combination with the crank shaft of an engine, of a disk fixed thereon, an eccentric upon said disk and lineally displaceable with respect thereto, and a brake disk loosely supported on said shaft and having an annular groove eccentrically positioned with respect to said shaft, said eccentric being provided with means engaging said groove whereby by varying the relative positions of said disk and said brake disk the center of said eccentric will be varied in a lineal direction to vary the steam supply.

2. In a device of the character described, the combination with the crank shaft of an engine, of a disk fixed thereon, an eccentric upon said disk and lineally displaceable with respect thereto, and a brake disk loosely supported on said shaft and having an annular groove eccentrically positioned with respect to said shaft, a spring connecting said fixed disk and said brake disk, a brake band engaging said brake disk, and means for varying the pressure of said band upon said brake disk, whereby said brake disk may be made to lag behind said fixed disk at varying angles depending on the pressure.

3. In a device of the character described, the combination with the crank shaft of an engine, of a disk fixed thereon, an eccentric upon said disk and lineally displaceable with respect thereto, and a brake disk loosely supported on said shaft and having an annular groove eccentrically positioned with respect to said shaft, a block slidingly engaging said groove, means connecting said eccentric with said block, whereby by varying the relative positions of said disk and said brake disk the center of said eccentric will be varied in a lineal direction to vary the steam supply, the diameter of said annular groove being such that said sliding block is self braking, whereby shocks due to the valve gear will not affect the angle between the fixed disk and the brake disk.

In testimony whereof I have affixed my signature in presence of two witnesses.

ERICH SCHWETER.

Witnesses:
C. BLOCH,
A. V. JONES.

---

Copies of this patent may be obtained for five cents each, by addressing the "Commissioner of Patents, Washington, D. C."